(12) United States Patent
Nishio

(10) Patent No.: US 8,532,467 B2
(45) Date of Patent: Sep. 10, 2013

(54) TRANSMITTING DEVICE, RECEIVING DEVICE AND TRANSMITTING/RECEIVING DEVICE

(75) Inventor: Toshiroh Nishio, Osaka (JP)

(73) Assignee: Panasonic Corporation, Osaka (JP)

( * ) Notice: Subject to any disclaimer, the term of this patent is extended or adjusted under 35 U.S.C. 154(b) by 1220 days.

(21) Appl. No.: 12/281,056

(22) PCT Filed: Mar. 2, 2007

(86) PCT No.: PCT/JP2007/053995
§ 371 (c)(1),
(2), (4) Date: Aug. 28, 2008

(87) PCT Pub. No.: WO2007/102413
PCT Pub. Date: Sep. 13, 2007

(65) Prior Publication Data
US 2009/0046993 A1    Feb. 19, 2009

(30) Foreign Application Priority Data

Mar. 3, 2006  (JP) ................................. 2006-057404

(51) Int. Cl.
*H04N 5/94* (2006.01)
*H04N 9/88* (2006.01)

(52) U.S. Cl.
USPC ............ 386/264; 386/235; 386/262; 386/335

(58) Field of Classification Search
USPC .................................. 386/235, 335, 262, 264
See application file for complete search history.

(56) References Cited

U.S. PATENT DOCUMENTS 6,851,116 B1 * 2/2005 Yoshikawa .................... 719/322
7,447,815 B2   11/2008 Weaver et al.
2002/0037084 A1 * 3/2002 Kakuhari et al. ............... 381/98
2004/0128402 A1 * 7/2004 Weaver et al. .................... 710/1
2006/0132649 A1 * 6/2006 Miyazawa ..................... 348/458
2006/0209880 A1 * 9/2006 Chang et al. ................... 370/464
2006/0222344 A1 * 10/2006 Ukai et al. ..................... 386/123
2007/0109262 A1 * 5/2007 Oshima et al. ................ 345/156

FOREIGN PATENT DOCUMENTS

| CN | 1476558 A | 2/2004 |
| CN | 200780007548.7 | 11/2010 |
| EP | 07 73 7644 | 4/2010 |
| JP | 09-240940 A | 9/1997 |
| JP | 9-240940 A | 9/1997 |
| JP | 11-187034 A | 7/1999 |
| JP | 2000-307594 A | 11/2000 |
| JP | 2002-374461 A | 12/2002 |
| JP | 2004-107013 A | 4/2004 |
| JP | 2004-194110 A | 7/2004 |
| JP | 2008-503819 | 10/2010 |

OTHER PUBLICATIONS

International Search Report for PCT/JP207/053995, dated May 29, 2007.
HDMI Consortium: High-Definition Multimedia Interface, Specification Version 1.1, Hitachi, Ltd, et al., May 20, 2004, pp. 1-206, XP-002408058.
HDMI Licensing, LLC, High-Definition Multimedia Interface, Specification Version 1.3a, Hitachi, Ltd, et al., Nov. 10, 2006.

* cited by examiner

*Primary Examiner* — Kambiz Zand
*Assistant Examiner* — Ali Shayanfar
(74) *Attorney, Agent, or Firm* — RatnerPrestia

(57) ABSTRACT

A transmitting device, a receiving device and a transmitting and receiving device includes multiple devices connected. When these devices have duplicate functions for processing video signals or audio signals, these signals are processed using optimal circuits by comparing functions for processing video signals or audio signals in the devices.

13 Claims, 15 Drawing Sheets

FIG. 2A

| Function name | Yes/No (Yes:O,No:×) | ON/OFF Yes,No |
|---|---|---|
| IP conversion | × | - |
| Digital AI | O | Yes |
| Edge enhancement | O | Yes |
| Color correction | O | No |

FIG. 2B

| Function name | Yes/No (Yes:O,No:×) | ON/OFF Yes,No |
|---|---|---|
| IP conversion | O | Yes |
| Digital AI | O | Yes |
| Edge enhancement | O | No |
| Color correction | O | Yes |

FIG. 3A

| Function name | Level | ON/OFF Yes,No |
|---|---|---|
| IP conversion | 0 | - |
| Digital AI | 3 | Yes |
| Edge enhancement | 1 | Yes |
| Color correction | 2 | No |

FIG. 3B

| Function name | Level | ON/OFF Yes,No |
|---|---|---|
| IP conversion | 3 | Yes |
| Digital AI | 2 | Yes |
| Edge enhancement | 3 | No |
| Color correction | 3 | Yes |

FIG. 3C

| | None | 0 |
|---|---|---|
| IP conversion | Low | 1 |
| | Medium | 2 |
| | High | 3 |

FIG. 3D

| | None | 0 |
|---|---|---|
| Digital AI | Low | 1 |
| | Medium | 2 |
| | High | 3 |

FIG. 3E

| | None | 0 |
|---|---|---|
| Edge enhancement | Low | 1 |
| | Medium | 2 |
| | High | 3 |

FIG. 3F

| | None | 0 |
|---|---|---|
| Color correction | Low | 1 |
| | Medium | 2 |
| | High | 3 |

| Still or motion picture | Still picture | 0 |
|---|---|---|
| | Motion picture | 1 |

| Original resolution and output resolution | | Mode |
|---|---|---|
| Original | Output | |
| 480i | 1080i | 0 |
| 720p | 1080i | 1 |
| 1080i | 1080i | 2 |
| ⋮ | ⋮ | ⋮ |

| ID No. | Audio data |
|---|---|
| 1 | Select recording start time. |
| 2 | Select recording end time. |
| 3 | Press OK if acceptable. |
| ⋮ | ⋮ |

FIG. 13

| Byte/Bit# | 7 | 6 | 5 | 4 | 3 | 2 | 1 | 0 |
|---|---|---|---|---|---|---|---|---|
| HB0 | Packet Type ||||||||
| HB1 | Packet - specific data ||||||||
| HB2 | Packet - specific data ||||||||

FIG. 14

| Packet Type Value | Packet Type |
|---|---|
| 0×00 | Null |
| 0×01 | Audio Clock Regeneration(N/CTS) |
| 0×02 | Audio Sample |
| 0×03 | General Control |
| 0×04 | ACP Packet |
| 0×05 | ISRC1 Packet |
| 0×06 | ISRC2 Packet |
| 0×07 | Reserved for DSD Packet |
| 0×80+InfoFrame Type | EIA/CEA-861B infoFrame |
| 0×81 | Vendor-Specific infoFrame |
| 0×82 | AVI infoFrame |
| 0×83 | Source Product Descriptor infoFrame |
| 0×84 | Audio infoFrame |
| 0×85 | MPEG Source infoFrame |

FIG. 15

| | |
|---|---|
| InfoFrame Type Code(HB0) | 2 (hexadecimal number) |
| InfoFrame Version Number(HB1) | 2 (hexadecimal number) |
| Length of AVI InfoFrame(HB2) | Length of AVI InfoFrame(13) |
| Data Byte 1 | Overscan and under scan information |
| Data Byte 2 | Aspect ratio information |
| Data Byte 3 | Reserved for future |
| Data Byte 4 | Video format information |
| Data Byte 5 | Reserved |
| Data Byte 6 | |
| Data Byte 7 | |

| | |
|---|---|
| Data Byte 12 | |
| Data Byte 13 | |

FIG. 16

| Video Code | Video Description | EIA/CEA-861B Pixel Repeat Values | HDMI Pixel Repeat Values |
|---|---|---|---|
| 1 | 640×480p@60Hz | No Repetition | No Repetition |
| 2,3 | 720×480p@59.94/60Hz | No Repetition | No Repetition |
| 4 | 1280×720p@59.94/60Hz | No Repetition | No Repetition |
| 5 | 1920×1080i@59.94/60Hz | No Repetition | No Repetition |
| 6,7 | 720(1440)×480i@59.94/60Hz | Pixel sent 2 times | Pixel sent 2 times |
| 8,9 | 720(1440)×240p@59.94/60Hz | Pixel sent 2 times | Pixel sent 2 times |
| 10,11 | 2880×480i@59.94/60Hz | Pixel sent 1 to 10 times | Pixel sent 1 to 10 times |
| 12,13 | 2880×240p@59.94/60Hz | Pixel sent 1 to 10 times | Pixel sent 1 to 10 times |
| 14,15 | 1440×480p@59.94/60Hz | No Repetition | Pixel sent 1 to 2 times** |
| 16 | 1920×1080p@59.94/60Hz | No Repetition | No Repetition |
| 17,18 | 720×576p@50Hz | No Repetition | No Repetition |
| 19 | 1280×720p@50Hz | No Repetition | No Repetition |
| 20 | 1920×1080i@50Hz | No Repetition | No Repetition |
| 21,22 | 720(1440)×576i@50Hz | Pixel sent 2 times | Pixel sent 2 times |
| 23,24 | 720(1440)×288p@50Hz | Pixel sent 2 times | Pixel sent 2 times |
| 25,26 | 2880×576i@50Hz | Pixel sent 1 to 10 times | Pixel sent 1 to 10 times |
| 27,28 | 2880×288@50Hz | Pixel sent 1 to 10 times | Pixel sent 1 to 10 times |
| 29,30 | 1440×576p@50Hz | No Repetition | Pixel sent 1 to 2 times** |
| 31 | 1920×1080p@50Hz | No Repetition | No Repetition |
| 32 | 1920×1080p@23.97/24Hz | No Repetition | No Repetition |
| 33 | 1920×1080p@25Hz | No Repetition | No Repetition |
| 34 | 1920×1080p@29.97/30Hz | No Repetition | No Repetition |

FIG. 17

| InfoFrame Type Code(HB1) | InfoFrame Type 03$_{16}$ (new) | |
|---|---|---|
| InfoFrame Version Number | Version =01$_{16}$ | |
| Length of Source Product Description InfoFrame(HB2) | Length of Source Product Description InfoFrame = 25 | |
| Data Byte 1 | 0 | Vendor Name Character 1 VN1(7bit ASCII code) |
| Data Byte 2 | 0 | Vendor Name Character 2 VN2 |
| Data Byte 3 | 0 | Vendor Name Character 3 VN3 |
| Data Byte 4 | 0 | Vendor Name Character 4 VN4 |
| Data Byte 5 | 0 | Vendor Name Character 5 VN5 |
| Data Byte 6 | 0 | Vendor Name Character 6 VN6 |
| Data Byte 7 | 0 | Vendor Name Character 7 VN7 |
| Data Byte 8 | 0 | Vendor Name Character 8 VN8 |
| Data Byte 9 | 0 | Product Description Character 1 PD1 (7-bit ASCII code) |
| Data Byte 10 | 0 | Product Description Character 2 PD2 |
| Data Byte 11 | 0 | Product Description Character 3 PD3 |
| Data Byte 12 | 0 | Product Description Character 4 PD4 |
| Data Byte 13 | 0 | Product Description Character 5 PD5 |
| Data Byte 14 | 0 | Product Description Character 6 PD6 |
| Data Byte 15 | 0 | Product Description Character 7 PD7 |
| Data Byte 16 | 0 | Product Description Character 8 PD8 |
| Data Byte 17 | 0 | Product Description Character 9 PD9 |
| Data Byte 18 | 0 | Product Description Character 10 PD10 |
| Data Byte 19 | 0 | Product Description Character 11 PD11 |
| Data Byte 20 | 0 | Product Description Character 12 PD12 |
| Data Byte 21 | 0 | Product Description Character 13 PD13 |
| Data Byte 22 | 0 | Product Description Character 14 PD14 |
| Data Byte 23 | 0 | Product Description Character 15 PD15 |
| Data Byte 24 | 0 | Product Description Character 16 PD16 |
| Data Byte 25 | Source Device Information (see below) | |

TRANSMITTING DEVICE, RECEIVING DEVICE AND TRANSMITTING/RECEIVING DEVICE

This Application is a U.S. National Phase Application of PCT INTERNATIONAL APPLICATION PCT/JP2007/053995.

FIELD OF THE INVENTION

The present invention relates to video and audio signal processing systems and transmitting and receiving devices in which multiple devices are connected for processing, transmitting, and outputting video and audio signals.

BACKGROUND OF THE INVENTION

In line with the recent spread of the use of HDMI (Trademark) as a digital interface for connecting devices, baseband signals are increasingly being used for connecting multiple devices for transmitting digital data with high picture and sound quality. Each device is often installed with its own high picture quality circuit or high sound quality circuit. However, each high picture quality circuit and high sound quality circuit is designed to achieve the optimal picture quality and optimal sound quality by each device alone. Accordingly, when picture or sound is output after going through multiple devices, the optimal picture quality and sound quality are not always output.

In particular, a display device, which is a signal-receiving unit, often adaptively switches circuits depending on whether each frame or a part of the frame is a still picture or motion picture. However, a still picture or motion picture is determined only based on the video information received. Accordingly, erroneous detection may occur depending on the determination algorithm and picture property, resulting in below optimal picture quality.

As a measure for improving this point, the next system is proposed when multiple devices are connected by a bi-directional bus such as IEEE1394 (Trademark). The proposed system is to determine which device should operate which function by making each device retain attribute information that indicates whether processing is feasible by the device and comparing the availability of decoding.

However, in the above system, the entire system cannot be controlled optimally based on selection of each function for outputting the highest picture quality and highest sound quality in a transmitting device and receiving device. In addition, the above system is not feasible to correctly determine a motion picture and still picture based on the accuracy of a frame or a part of the frame in processing at the receiving device.

Furthermore, the above system results in duplicate processing if video signals and audio signals are processed in both transmitting device and receiving device. This results in an increased load on the entire system including the transmitting device and receiving device. The above system has these disadvantages.

[Patent Document 1] Japanese Patent Unexamined Publication No. H11-187034
[Nonpatent Document 1] HDMI standard, Specification Version 0.9, 1.0, and 1.1 of High Definition Multimedia Interface

SUMMARY OF THE INVENTION

A video and audio signal processing system and a transmitting and receiving device of the present invention offer optimal control of an entire system by selecting a function for outputting the highest picture quality and highest sound quality in a transmitting device or receiving device, while reducing load on the entire system. In addition, the video and audio signal processing system and the transmitting and receiving device of the present invention enable selection of a high picture quality circuit and high sound quality circuit based on the accuracy of a frame or a part of the frame.

The transmitting and receiving device includes a transmitting device that can output after correcting a picture quality or sound quality relative to input broadcast waves, and a receiving device that has a function to correct a picture quality or sound quality, similar to the transmitting device, and can output after correcting a picture quality or sound quality relative to input broadcast waves. The transmitting device includes a first high picture quality processing circuit with a function to correct input broadcast signals for correcting input broadcast signals, a first recorder for recording first circuit attribute information that indicates a function of the first high picture quality processing circuit, and a control circuit for controlling the function of the first high picture quality processing circuit. The control circuit can receive a control signal from the receiving device. The receiving device includes a second high picture quality processing circuit for correcting a signal output from the transmitting device, a second recorder for recording second circuit attribute information that indicates a function of the second high picture quality processing circuit, and a comparator for outputting the first circuit attribute information recorded in the first recorder from the transmitting device and controlling the function of the second high picture quality processing circuit based on the output first circuit attribute information and the second circuit attribute information recorded in the second recorder. Based on a comparison result of the comparator, whether the first high picture quality processing circuit or the second high picture quality processing circuit is used for correcting broadcast signals is selected.

The transmitting device can output after correcting the picture quality or sound quality relative to input broadcast waves, supplies an output signal and information related to the output signal to the receiving device, and can receive a control signal from the receiving device. The transmitting device includes a video signal source for outputting a video signal based on broadcast waves; the first high picture quality processing circuit with a function to correct an input signal for correcting a signal output from the video signal source, and supplying the corrected signal to the receiving device; the control circuit that can receive the control signal and controls the function of the first high picture quality processing circuit; and the first recorder for recording the first circuit attribute information that indicates the function of the first high picture quality processing circuit, and outputting the first circuit attribute information.

The receiving device has a function to correct the picture quality or sound quality, similar to the transmitting device, can correct the picture quality or sound quality relative to an input signal and output, receives an input signal and information related to the signal from the transmitting device, and can supply the control signal to the transmitting device. The receiving device includes the second high picture quality processing circuit with a function to correct a signal for correcting the input signal, a temporary memory for storing information related to the signal input to the second high picture quality processing circuit, a second recorder for recording the second circuit attribute information that indicates the function of the second high picture quality processing circuit, a comparator that can transmit the control signal and controls the function of the second high picture quality processing circuit based on the second circuit attribute information stored in the second recorder and information stored in the temporary memory, and a display device for displaying the output of the second high picture quality processing circuit.

The transmitting device includes the audio signal source for outputting the audio signal, a audio data generator for generating audio data, and a first microcomputer for controlling the audio data generator. The audio data generator transmits the audio data and an ID number for distinguishing the audio data in advance using a low-speed signal line independent from a transmission line for the video signal. When the sound needs to be generated using the audio data, the ID number for corresponding audio data is transmitted in a blanking period of the video signal.

The receiving device includes a synthesizer, a sound-generating device for generating sound upon receiving an output from the synthesizer, a temporary memory for receiving audio data and an ID number for distinguishing the audio data via a low-speed signal line independent from the transmission line for the video signal and storing the audio data and ID number in advance, and the controller. When the ID number of the sound to be generated is transmitted, the controller supplies the audio data corresponding to the ID number from the temporary memory to the synthesizer. The synthesizer then synthesizes the audio signal received and the audio data.

BRIEF DESCRIPTION OF DRAWINGS

FIG. 2A is an example of circuit attribute information of the present invention.

FIG. 2B is another example of circuit attribute information of the present invention.

FIG. 3A is another example of circuit attribute information of the present invention.

FIG. 3B is another example of circuit attribute information of the present invention.

FIG. 3C is another example of circuit attribute information of the present invention.

FIG. 3D is another example of circuit attribute information of the present invention.

FIG. 3E is another example of circuit attribute information of the present invention.

FIG. 3F is another example of circuit attribute information of the present invention.

FIG. 13 illustrates a structure of a packet header of the data island in accordance with the present invention.

FIG. 14 illustrates a structure of the Packet Type Value in accordance with the present invention.

FIG. 15 illustrates a structure of data stored in AVI in accordance with the present invention.

FIG. 16 illustrates types of video format in accordance with the present invention.

FIG. 17 illustrates a structure of Source Product Description InfoFrame in accordance with the present invention.

Figure 1:
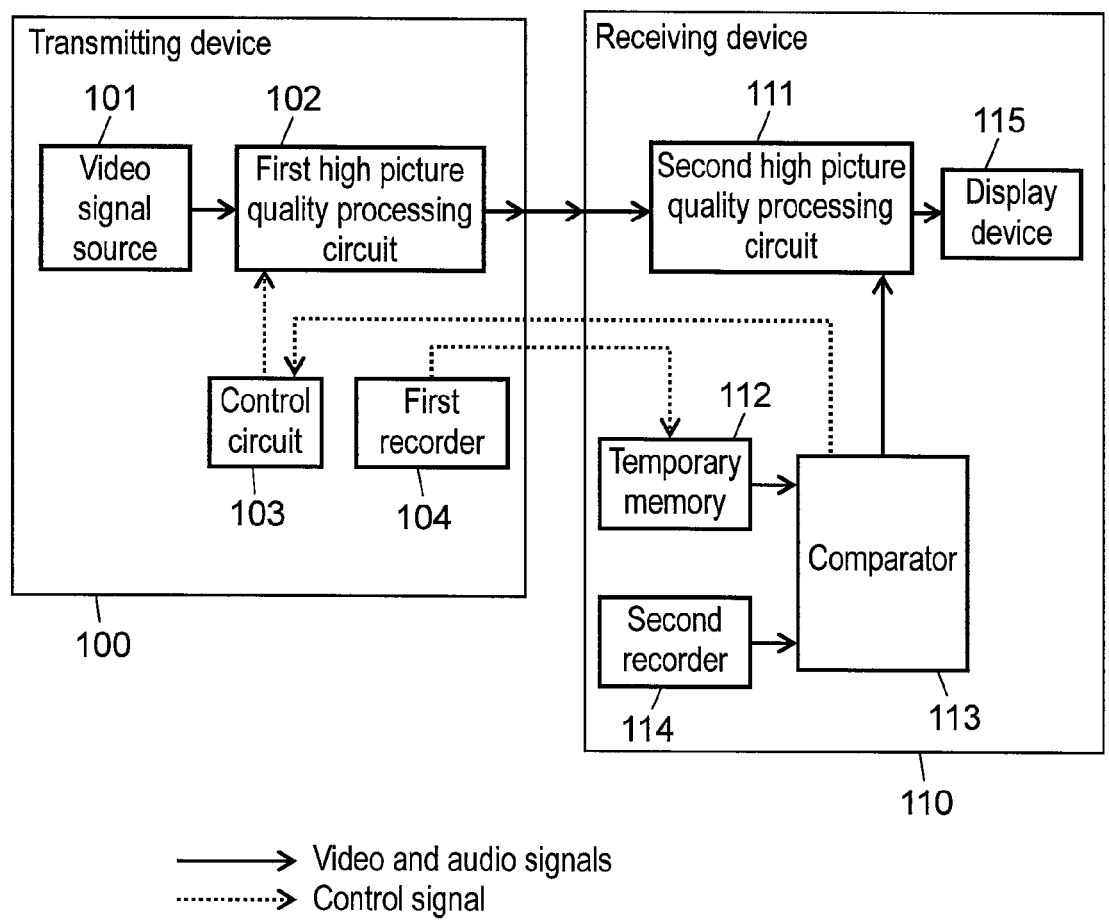
FIG. 1 is a block diagram of a structure of a transmitting device and a receiving device of the present invention.

REFERENCE MARKS IN THE DRAWINGS 100, 600 Transmitting device
101 Video signal source
102 First high picture quality processing circuit
103 Control circuit
104 First recorder
110, 610 Receiving device
111 Second high picture quality processing circuit
112, 613 Temporary memory
113 Comparator
114 Second recorder
115 Display device
800A HDMI Source
800B HDMI-compliant STB
803 Video signal
805 Audio signal
807 Control signal
808 Multiplex circuit
809 Multiplex signal
810 HDCP encryption circuit
812 First HDCP key generator
814 TMDS transmitting circuit
816 HDMI connecting terminal
818 Second microcomputer
900A HDMI Sink
900B HDMI-compliant TV
902 HDMI connecting terminal
904 EDID
906 TMDS receiving circuit
908 HDCP decryption circuit
910 Video signal extraction circuit
912 Audio signal extraction circuit
914 Control signal extraction circuit
916 Second HDCP key generator
918 Third microcomputer
920 TV display unit
922 Digital-analog converter
924 Sound output unit
926 Packet determination circuit
1002 Differential signal line
1004 Differential signal line
1006 Differential signal line
1008 Differential signal line
1010 Differential signal line
1012 Differential signal line

DETAILED DESCRIPTION OF PREFERRED EMBODIMENTS

Exemplary embodiments of the present invention are described below with reference to drawings. They are just exemplary embodiments, and thus the intention of the present invention is not limited to these exemplary embodiments.

First Exemplary Embodiment

FIG. 1 is a block diagram of the structure of a transmitting device and a receiving device in the first exemplary embodiment of the present invention. Transmitting device 100 includes video signal source 101, first high picture quality processing circuit 102, control circuit 103, and first recorder 104. Receiving device 110 includes second high picture quality processing circuit 111, temporary memory 112, comparator 113, second recorder 114, and display device 115.

Video signal source 101 is generally configured with an MPEG decoder, and outputs a baseband video signal. First high picture quality processing circuit 102 processes the signal output from video signal source 101 into high picture quality. Control circuit 103 controls the operation of first high picture quality processing circuit 102. First recorder 104 stores first circuit attribute information of transmitting device 100. Temporary memory 112 temporarily stores the first circuit attribute information recorded in first recorder 104. Second recorder 114 stores second circuit attribute information of receiving device 110. Comparator 113 compares the first circuit attribute information of transmitting device 100 stored in temporary memory 112 and the second circuit attribute information. Second high picture quality processing circuit 111 processes the signal output from first high picture quality processing circuit 102 into high picture quality. Display device 115 displays images. A specific combination of transmitting device 100 and receiving device 110 is a TV for displaying signals output from a set top box (STB) as receiving device 110 when transmitting device 100 is the STB receiving broadcast signals from a broadcast station. If transmitting device 100 is a recording and playback device, receiving device 110 is typically configured with a TV. However, the prevent invention is not limited to the above combinations as long as transmitting device 100 and receiving device 110 have the structures described above. In the above description, transmitting device 100 and receiving device 110 are connected, typically by HDMI (Trademark), for allowing the sending and receiving of digital signals. However, the present invention is not limited to this wiring as long as the signals described below can be sent and received.

FIG. 2A is an example of the first circuit attribute information, and FIG. 2B is an example of the second circuit attribute information. The operation of the first exemplary embodiment of the present invention is further described with reference to these examples. As shown in FIGS. 2A and 2B, the first circuit attribute information and the second circuit attribute information refer to information of functions for controlling the picture quality relative to video signals, such as IP conversion, digital AI, edge enhancement, and color correction. These functions, including IP conversion, digital AI, edge enhancement, and color correction, are functions for predetermined items. In FIGS. 2A and 2B, the "yes/no" column indicates whether each of the above functions exists or not. If marked "x," a target function is not featured. If marked "O," a target function is featured. The "ON/OFF" column indicates the feasibility of switching each function between enabled and disabled. If this column is marked "Yes," the operation of a target function can be switched between enabled and disabled. If marked "No," the target function cannot be switched between enabled and disabled. If the "ON/OFF" column is marked "-," it indicates that the target function is not featured and thus switchover does not exist. The first exemplary embodiment refers to the control of video signals. However, the present invention is not limited to this control. Although not illustrated, the sound quality can be controlled relative to audio signals.

First, when transmitting device 100 and receiving device 110 are connected, receiving device 110 stores the first circuit attribute information recorded in first recorder 104 of transmitting device 100 in temporary memory 112. Then, comparator 113 compares the second circuit attribute information with the first circuit attribute information recorded in temporary memory 112. In the first exemplary embodiment, temporary memory 112 and comparator 113 are installed in receiving device 110. However, the present invention is not limited to this structure. Temporary memory 112 and comparator 113 may be installed in transmitting device 100. In addition, the first circuit attribute information is passed over at the time when transmitting device 100 and receiving device 110 are connected in the first exemplary embodiment. However, the present invention is not limited to this structure. The first circuit attribute information may be passed over after every predetermined period.

Next, the operation of comparator 113 is described. Suppose that the first circuit attribute information is defined as shown in FIG. 2A, and the second circuit attribute information is defined as shown in FIG. 2B. In this case, comparator 113 determines that it is better to enable second high picture quality processing circuit 111 in receiving device 110 to execute the IP conversion function because there is no IP conversion function in transmitting device 100. The digital AI function is featured in both transmitting device 100 and receiving device 110. Although the digital AI function can be executed in either transmitting device 100 or receiving device 100, receiving device 110 is assumed to have, in general, a better function. Accordingly, comparator 113 determines to execute the AI function using high picture quality processing circuit 111 in receiving device 110. The edge enhancement function is also featured in both transmitting device 100 and receiving device 110. However, as shown in FIG. 2B, second high picture quality processing circuit 111 in receiving device 110 has no option to disable the edge enhancement function. Accordingly, comparator 113 determines that it is better to execute the edge enhancement function using second high picture quality processing circuit 111 in receiving device 110. The color correction function is featured in both transmitting device 100 and receiving device 110. However, as shown in FIG. 2A, first high picture quality processing circuit 102 in transmitting device 100 has no option to disable the color correction function. Accordingly, comparator 113 determines that it is better to execute the color correction function using first high picture quality processing circuit 102 in transmitting device 100.

One output of comparator 113 is connected to second high picture quality processing circuit 111 for executing functions determined in the above process. In addition, another output of comparator 113 is connected to control circuit 103 controlling first high picture quality processing circuit 102. Control circuit 103 then enables the function that is determined to be executed in transmitting device 100 in the above process.

In a system in which transmitting device 100 and receiving device 110 are connected, the above process avoids duplicate high picture quality processing even if a circuit for the same processing is present in multiple devices connected to each other. In addition, the above process enables selection of an optimal circuit. Accordingly, operations that effectively use the features of the system without duplication or omission are achievable.

The above description refers to the correction of picture quality relative to the video signals contained in input broadcast waves. However, the present invention is not limited to this correction. The present invention is also applicable to the correction of sound quality relative to the audio signals contained in input broadcast waves and correction of signals relative to data signals contained in input broadcast waves.

Second Exemplary Embodiment

A block diagram of the second exemplary embodiment is the same as FIG. 1. The only difference from the first exemplary embodiment is the content of the first circuit attribute information and the second circuit attribute information. FIG. 3A is an example of the content of the first circuit attribute information of transmitting device 100 in the second exemplary embodiment. FIG. 3B is an example of the content of the second circuit attribute information of receiving device 110 in the second exemplary embodiment. Functions such as IP conversion, digital AI, edge enhancement, and color correction are predetermined items.

Components and operations that are the same as the first exemplary embodiment are omitted from description, and those that are different from the first exemplary embodiment are mainly described below.

In the second exemplary embodiment, temporary memory 112 and comparator 113 are installed in receiving device 110. However, the present invention is not limited to this structure. Temporary memory 112 and comparator 113 may be installed in transmitting device 100. Also in the second exemplary embodiment, the circuit attribute information is passed over at the time when transmitting device 100 and receiving device 110 are connected. However, the present invention is not limited to this structure. The circuit attribute information may be passed over after every predetermined period.

In the first exemplary embodiment, comparator 113 comparing functions does not have a clear judgment criteria for selecting which device to execute the digital AI function, for example, when both transmitting device 100 and receiving device 110 have the digital AI function whose on and off is controllable. On the other hand, in the second exemplary embodiment, the superiority of the function is specified by level so that a circuit having a function with a higher performance is selectable.

In FIG. 3A, the "yes/no" column in FIG. 2A is replaced with a "level" column, and in FIG. 3B, the "yes/no" column in FIG. 2B is replaced with the "level" column. FIGS. 3C to 3F show examples of definition of this "level." If the level is "0," the target function is not available. The target function has increasing performance in the order of levels "1," "2," and "3." FIG. 3C is a table showing levels of IP conversion. FIG. 3D is a table showing levels of digital AI. FIG. 3E is a table showing levels of edge enhancement. FIG. 3F is a table showing levels of color correction. As shown in FIG. 3A, level "3" is indicated in a column for the digital AI function of transmitting device 100. As shown in FIG. 3B, level "2" is indicated in a column for the digital AI function of receiving device 110. Even though the same function exists, more advanced processing can be expected with a function marked level "3" than that marked level "2." Accordingly, in this case, comparator 113 selects the digital AI function marked level "3" in transmitting device 100, and disables the same function in receiving device 110. In FIGS. 3C to 3F, "None" means that a target function itself is not featured. The superiority of the target functions increases in the order of "low," "medium," and "high."

Next, a method is described of determining which determination result to follow in the entire system when multiple comparators 113 are present in a connected system. A serial number is given to the comparison algorithm of each comparator in transmitting device 100 and receiving device 110 at the time of production. This serial member is, for example, stored in the memory of comparator 113. This memory is typically configured as a nonvolatile memory. Accordingly, the determination algorithm with the latest serial number (similar to a version number) is selected for operation. This achieves better signal processing results.

In preparation for a case in which serial numbers cannot be compared due to different manufacturers, shipment date may be stored in the memory in addition to the serial member.

The above processing system enables selection of the optimal circuit for high picture quality processing in further details based on the level information without executing duplicate processing even if a circuit for the same processing is present in duplicate in multiple devices, including transmitting device 100 and receiving device 110, connected in a system. Accordingly, operations that effectively use the features of the system without duplication or omission are achievable.

The above description refers to the correction of picture quality relative to the video signals contained in input broadcast waves. However, the present invention is not limited to this correction. The present invention is also applicable to the correction of sound quality relative to the audio signals contained in input broadcast waves and correction of signals relative to data signals contained in input broadcast waves.

Third Exemplary Embodiment

Figures 4A, 4B:
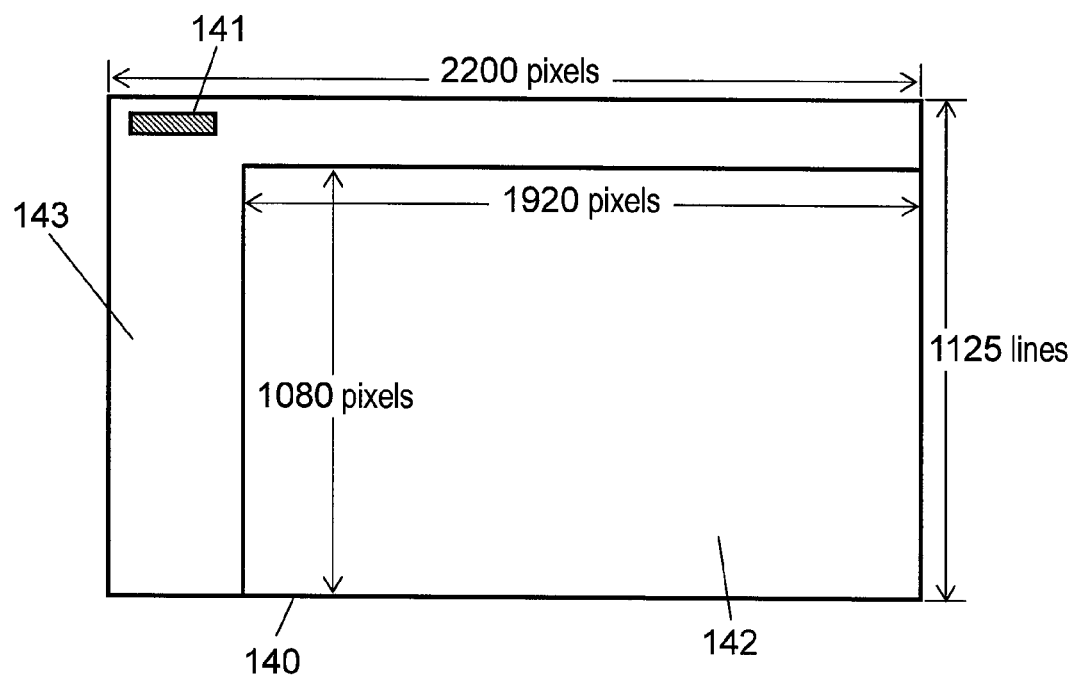
FIG. 4A illustrates a structure of a video frame transmitted from the transmitting device in accordance with the present invention.
FIG. 4B illustrates a structure of a video frame transmitted from the transmitting device in accordance with the present invention.

FIGS. 4A and 4B illustrate the third exemplary embodiment of the present invention. A block diagram of the third exemplary embodiment of the present invention is the same as FIG. 1. The contents of the first circuit attribute information and the second circuit attribute information in a transmitting and receiving device in the third exemplary embodiment are the same as that in the first exemplary embodiment. In addition, however, the specific information is superimposed in a blanking period of a video frame, as shown in FIG. 4A. The third exemplary embodiment is described below with reference to FIGS. 1, 4A, and 4B.

In general, the video signal is configured with about 30 frames or about 25 frames of images per second. FIG. 4A shows an example of the 1080i signal. The 1080i signal consists of 2200 horizontal pixels and 1125 vertical lines per frame. Of them, effective area 142 consists of 1920 horizontal pixels and 1080 vertical lines. Other area belongs to blanking period 143. In analog signal transmission, this blanking period 143 is effective for synchronizing pictures between the sending and receiving. However, in digital transmission, this blanking period 143 is lengthy, and thus this blanking period 143 can be used for transmitting information.

In HDMI transmission, data inserted in this blanking period 143 adopts a form of packet 141. Accordingly, a range of pieces of information can be sent in the same form of packet 141 by assigning an identification number to packet 141.

In transmitting device 100, a microcomputer recognizes whether a frame output at one time mostly consists of a still picture such as on-screen display or a regular motion picture. Accordingly, the microcomputer can transmit information of whether a target frame is a still picture or motion picture to receiving device 110 by using packet 141. Since it is apparent that the microcomputer is included so as to control the system, the microcomputer is not indicated in FIG. 1. In the third exemplary embodiment, as shown in FIG. 4B, "0" in the information transmitted by means of packet 141 indicates a still picture, and "1" indicates a motion picture.

When receiving device 110 receives information that the target frame is a still picture by means of packet 141, high picture quality processing for still picture is executed during internal signal processing of the target frame. In general, second high picture quality circuit 111 in receiving device 110 also independently determines whether the target frame is a still picture or a motion picture. Accordingly, a comprehensive determination can also be made without merely using the information received in packet 141. Second high picture quality circuit 111 can thus adaptively execute its processing.

In some cases, a part of the screen is a still picture and the other area is not, besides information only of whether or not the target frame is a still picture, as shown in FIG. 4B, is transferred. In this case, more accurate picture quality correction becomes feasible by indicating an area using horizontal and vertical coordinates in a content of packet 141.

The above description refers to the correction of picture quality relative to the video signals contained in input broadcast waves. However, the present invention is not limited to this correction. The present invention is also applicable to the correction of sound quality relative to the audio signals contained in input broadcast waves and correction of signals relative to data signals contained in input broadcast waves.

Fourth Exemplary Embodiment

Figures 5A, 5B:
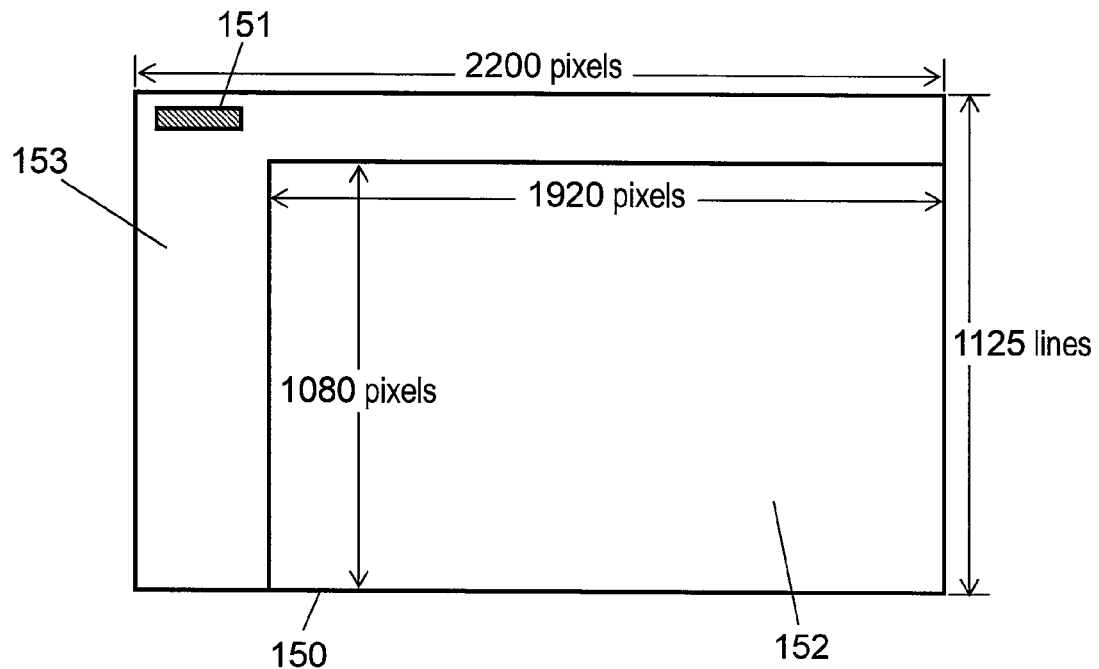
FIG. 5A illustrates a structure of a video frame transmitted from the transmitting device in accordance with the present invention.
FIG. 5B illustrates a structure of a video frame transmitted from the transmitting device in accordance with the present invention.

A block diagram of the fourth exemplary embodiment of the present invention is the same as FIG. 1, same as the first exemplary embodiment. The contents of the first circuit attribute information and the second circuit attribute information in FIG. 1 are the same as those in the first to third exemplary embodiments. As shown in FIGS. 5A and 5B, specific information is superimposed by means of packet 151 in blanking period 153 of a video frame, same as that in the third exemplary embodiment. However, the content transmitted in packet 151 differs from the content transmitted in packet 141.

A transmission method in the fourth exemplary embodiment is described below with reference to FIGS. 5A and 5B. FIG. 5A shows the structure of frame 150. Only the points that differ from those in FIG. 4A are described in FIG. 5A. The same points as those in FIG. 4A are omitted.

In general, the resolution of an image changes temporally, typically in broadcasting. If an image is output at a different resolution as it is from the set top box receiving the signals, the screen may flicker for dozens of milliseconds to hundreds of milliseconds until the display device 115 in the receiving side is physically synchronized. Viewers find this flickering of the screen uncomfortable. To avoid it, the resolution output from transmitting device 100 is set at a fixed resolution. In this case, better processing is achieved if resolution before conversion in transmitting device 100 and resolution after conversion are identified when a high picture quality circuit is applied in receiving device 110.

In the fourth exemplary embodiment, "original resolution" and "output resolution" are correlatively coded, as shown in FIG. 5B, and defined as a mode code. This mode code is transmitted in blanking period 153.

FIG. 5B is a table indicating an example of definition of the mode codes. For example, when the "original" resolution is 480i and "output" resolution is "1080i," the mode code is "0." If the "original" resolution is "720p" and the "output" resolution is "1080i," the mode code is "1." If the "original" resolution is "1080i" and the "output" resolution is 1080i, the mode code is "2."

In a conventional system, only transmitting device 100 has information of the original resolution, and receiving device 110 is not informed of the original resolution. However, by establishing the above system, the original resolution, obvious to transmitting device 100, can be informed to receiving device 110. This is effective for applying high picture quality processing by second high picture quality circuit 111 in receiving device 110. As a result, a high-quality image can be displayed.

In the same way, whether or not the original resolution has a progressive structure (progressive scanning), or whether or not IP conversion has been executed in transmitting device 100 (conversion from interlace to progressive scanning) can be transmitted for effective use in applying high picture quality processing. As a result, a high-quality image can be displayed.

The above description refers to the correction of picture quality relative to the video signals contained in input broadcast waves. However, the present invention is not limited to this correction. The present invention is also applicable to the correction of sound quality relative to the audio signals contained in input broadcast waves and correction of signals relative to data signals contained in input broadcast waves.

Fifth Exemplary Embodiment

A block diagram of the fifth exemplary embodiment of the present invention is the same as the block diagram of the fourth exemplary embodiment. However, the content transmitted in packet 153 is different.

Even in display units generally supporting 1080i, a display panel of display device 115 does not physically have formal 1920 horizontal pixels as the number of pixels for the display panel, and the number of pixels may be less than this level in some cases. For example, the display panel may only have 1280 horizontal pixels. This happens when a bit map pattern generated by computer graphics, such as an electronic program guide, is displayed. In this case, it may be preferable to transmit and display 1280 horizontal pixels, rather than transmitting data in 1920 horizontal pixels from transmitting device 100 to receiving device 110, for achieving a sharp outlines, in particular, thin vertical lines. Since the number of pixels is reduced in this case, load of transmission from transmitting device 100 to receiving device 110 can also be reduced.

In the fifth exemplary embodiment, receiving device 110 further includes "resolution of display panel" in the second circuit attribute information. Transmitting device 100 gains information of resolution of display panel in display device 115 via a low-speed signal line independent from a transmission line for video and audio signals. Accordingly, if a video frame currently output is a bit map pattern such as an electronic program guide, transmitting device 100 outputs the video frame in a resolution of display panel in display device 115. In addition, transmitting device 100 informs receiving device 110 of the resolution used for output by means of packet 151 (or packet 141) in blanking period 153 (or blanking period 143).

Provision of this system enables supply of information of resolution of the display panel to transmitting device 100 that is conventionally obvious only to receiving device 110. Accordingly, this is further useful for determining the output format in transmitting device 100. As a result, a further higher-quality image can be displayed.

The above description refers to the correction of picture quality relative to the video signals contained in input broadcast waves. However, the present invention is not limited to this correction. The present invention is also applicable to the correction of sound quality relative to the audio signals contained in input broadcast waves and correction of signals relative to data signals contained in input broadcast waves.

Sixth Exemplary Embodiment

Figures 6, 7:
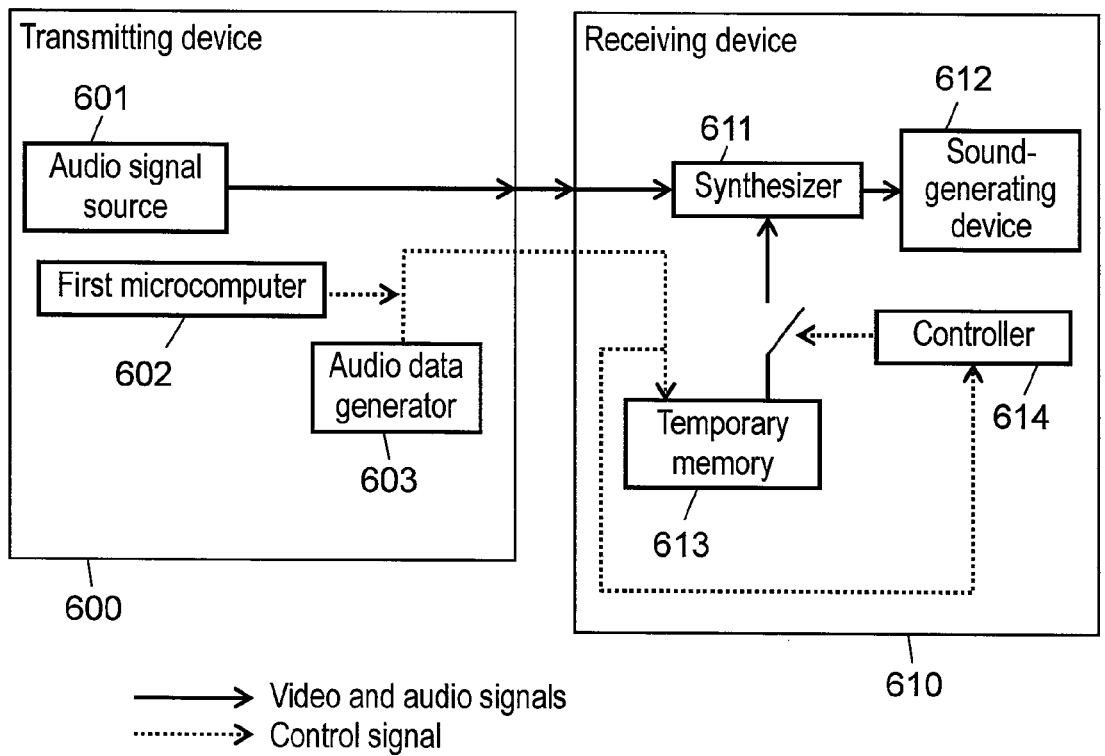
FIG. 6 is a block diagram of a structure of the transmitting device and the receiving device in accordance with the present invention.
FIG. 7 is an example of audio data ID

FIG. 6 is a block diagram of a transmitting and receiving device in the sixth exemplary embodiment of the present invention. Transmitting device 600 includes audio signal source 601, first microcomputer 602, and audio data generator 603. Receiving device 610 includes synthesizer 611, sound-generating device 612, temporary memory 613, and controller 614.

Audio signal source 601 is generally configured with an MPEG decoder, and outputs a baseband audio signal. First microcomputer 602 controls transmitting device 600. Audio data generator 603 generates preset audio data. Temporary memory 613 stores in advance audio data from audio data generator 603 in transmitting device 600. Controller 614 controls whether or not to synthesize the output of temporary memory 613. FIG. 7 shows an example of the content of audio data generator 603.

Audio signal source 601 decodes sound in electric waves such as broadcasting, and outputs the baseband audio signal.

First, the audio data of audio data generator 603 is copied and stored in advance in temporary memory 613 via the low-speed signal line.

FIG. 7 is a table indicating the relation between the audio data, whose copy is stored in temporary memory 613 in advance, and an ID number. In FIG. 7, the audio data of "Select recording start time." is recorded in ID number "1." Audio data of "Select recording end time." is recorded in ID number "2." Audio data of "Press OK if acceptable." is recorded in ID number "3." These are examples of the relation between audio data and ID numbers.

To generate sound in ID number "1," the ID number is transmitted to receiving device 510 via the low-speed signal line, instead of first microcomputer 602 sending the audio data from transmitting device 600. Based on the ID number, receiving device 610 calls the audio data to be reproduced from temporary memory 613, and synthesizer 611 synthesizes and outputs the data to sound-generating device 612.

The above structure allows superposition in receiving device 610 without superimposing audio data on a signal from audio signal source 601. If the audio signal output from transmitting device 600 is a compressed stream, this structure eliminates the need of decoding and re-compression, making transmission of high-quality sound feasible.

Seventh Exemplary Embodiment

Next, a specific structure when HDMI (Trademark) is applied to each of the above exemplary embodiments is described. The seventh exemplary embodiment is just an example, and thus the intention of the present invention is not limited to this exemplary embodiment.

Figure 8:
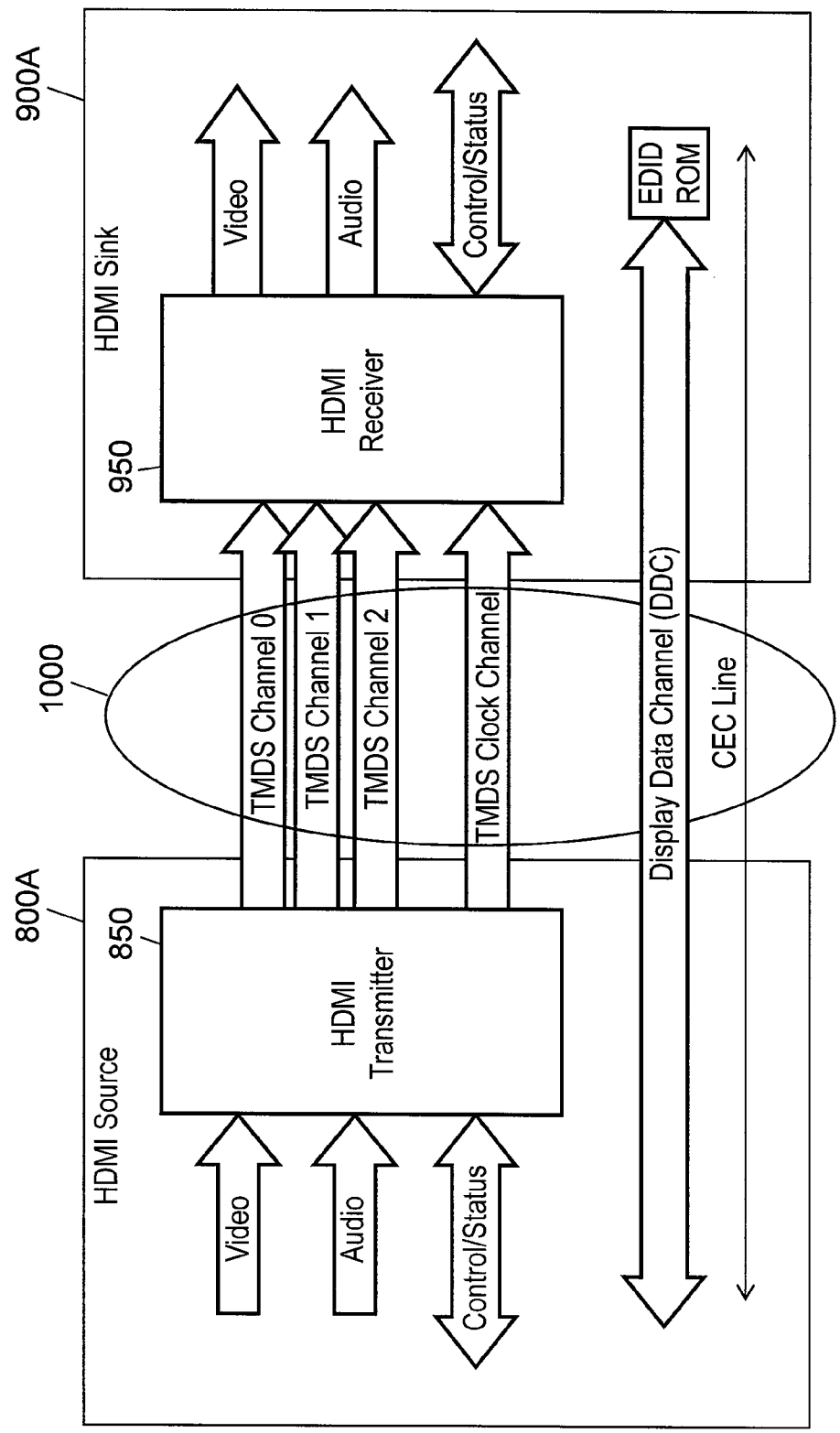
FIG. 8 is a block diagram of a schematic structure in accordance with the present invention.
Figure 10:
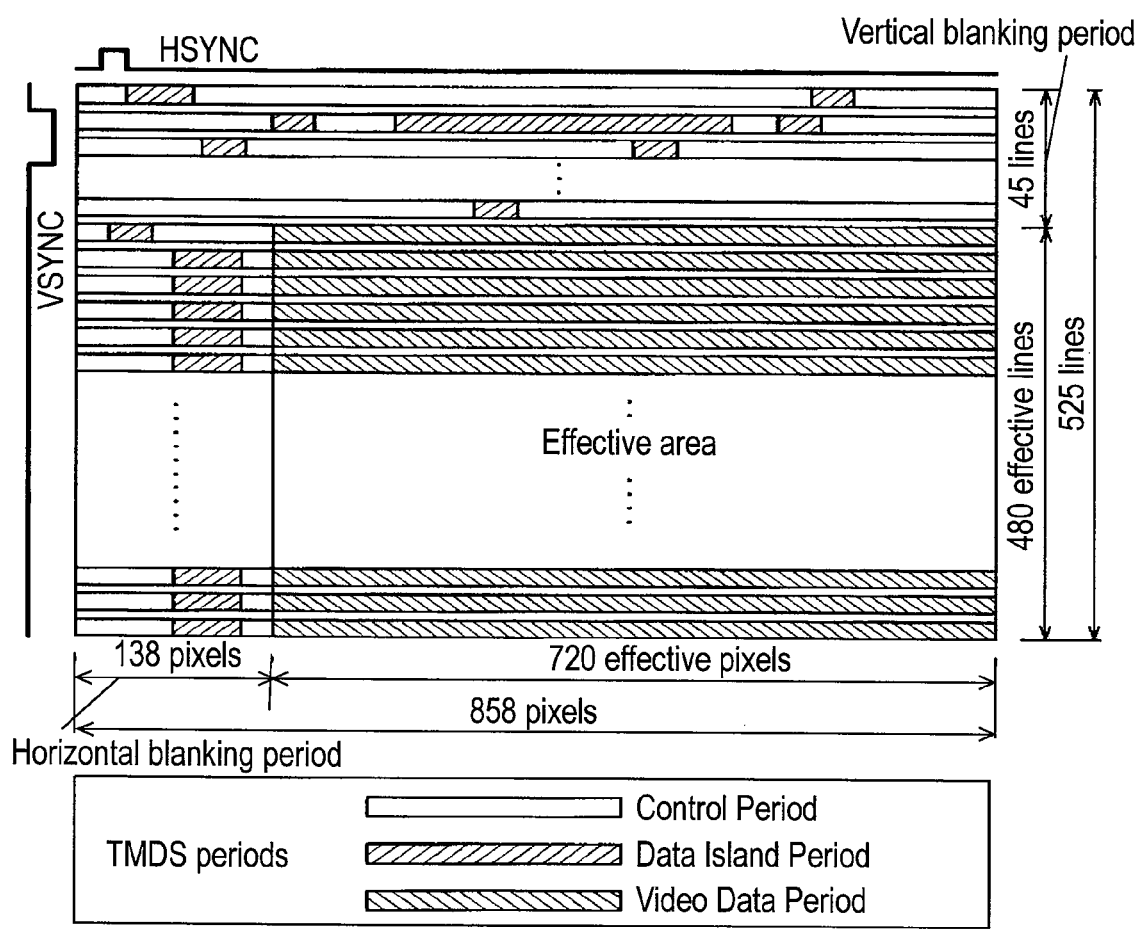
FIG. 10 illustrates a signal structure in accordance with the HDMI standard in accordance with the present invention.
Figure 11:
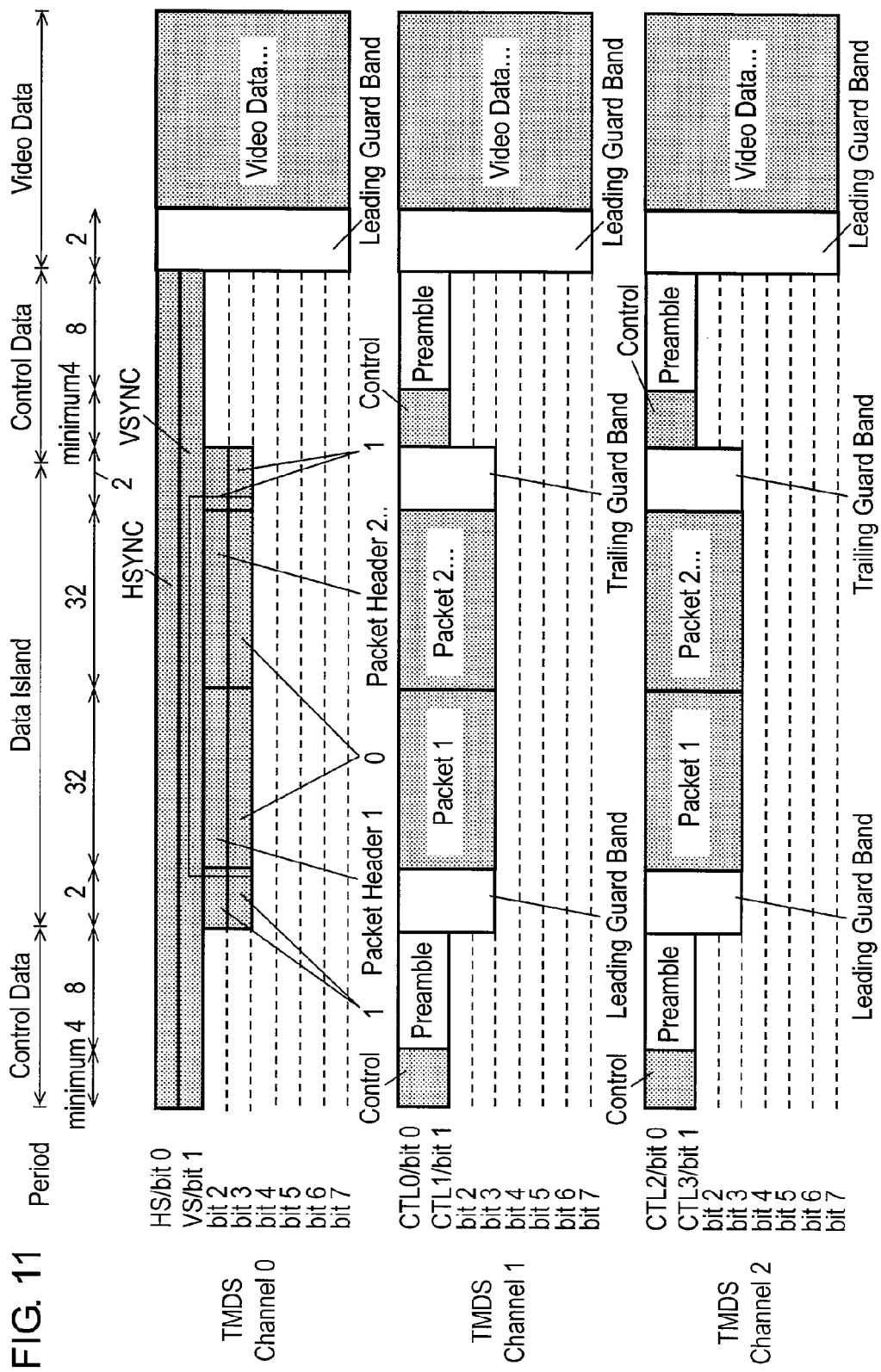
FIG. 11 illustrates a structure of a data island in accordance with the present invention.

In the seventh exemplary embodiment, FIGS. 8, 10, and 11 used for describing the HDMI (Trademark) standard is quoted from High Definition Multimedia Interface "Specification Version 0.9," "Specification Version 1.0," and "Specification Version 1.1." Accordingly, detailed description of each drawing is omitted, and only the points related to the present invention are described.

The structure for realizing the present invention is described below with reference to FIGS. 8 to 11. FIG. 8 is a block diagram of a structure of HDMI Source 800A and HDMI Sink 900A configured in accordance with the HDMI standard. HDMI Source 800A is installed in transmitting device 100 in FIG. 1 or transmitting device 600 in FIG. 6. HDMI Sink 900A is installed in receiving device 110 in FIG. 1 or receiving device 610 in FIG. 6.

HDMI Source 800A and HDMI Sink 900A are connected by Channel 1 to Channel 4 of TMDS (Transition Minimized Differential Signaling), TMDS Clock Channel, and DDC (Display Data Channel). HDMI cable and connector 1000 are connected by four differential signal lines 1002 to differential signal line 1008. TMDS data is transmitted by three differential signal lines 1002 (TMDS Channel 0) to differential signal line 1006 (TMDS Channel 2). Clock information is transmitted by one differential signal line 1008 (TMDS Clock Channel). Images, sounds, and control signals (auxiliary data) are transmitted by these differential signal lines 1002 to differential signal line 1008.

HDMI transmitter 850 shown in FIG. 8 receives a video signal (indicated as "video" in FIG. 8) and an audio signal (indicated as "audio" in FIG. 8), and inputs and outputs a control signal (indicated as "control/status" in FIG. 8). In addition, HDMI transmitter 850 sends the above TMDS data and clock information.

HDMI receiver 950 shown in FIG. 8 outputs the video signal (indicated as "video" in FIG. 8) and the audio signal (indicated as "audio" in FIG. 8), and inputs and outputs a control signal (indicated as "control/status" in FIG. 8). In addition, HDMI receiver 950 receives the above TMDS data and clock information.

Video data to be transmitted here can be coded to any of the formats of RGB, "YCbCr4:4:4," and "YCbCr4:2:2." RGB is a video format configured with red, green and blue components. "YCbCr4:4:4" is a video format configured with a luminance component and two color difference components, and a sampled frequency ratios of the luminance component and two color difference components are 4:4:4. "YCbCr4:2:2" is a video format configured with a luminance component and two color difference components, and a sampled frequency ratios of the luminance component and two color difference components are 4:2:2.

Differential signal line 1008 transmitting clock information transmits a video signal clock. This video signal clock is used for processing the TMDS data transmitted by aforementioned three differential signal lines 1002 to differential signal line 1006. In addition, HDMI Source 800A and HDMI Sink 900A are connected by differential signal line 1010 transmitting DDC. This differential signal line 1010 enables information exchange on respective structure and condition between HDMI Source 800A and HDMI Sink 900A. In addition, differential signal line 1012, which is CEC line, enables an advanced control function between multiple types of video and audio equipment.

The structures of HDMI Source 800A and HDMI Sink 900A configured in accordance with the HDMI standard shown in FIG. 8 are further detailed with reference to FIG. 9.

Figure 9:
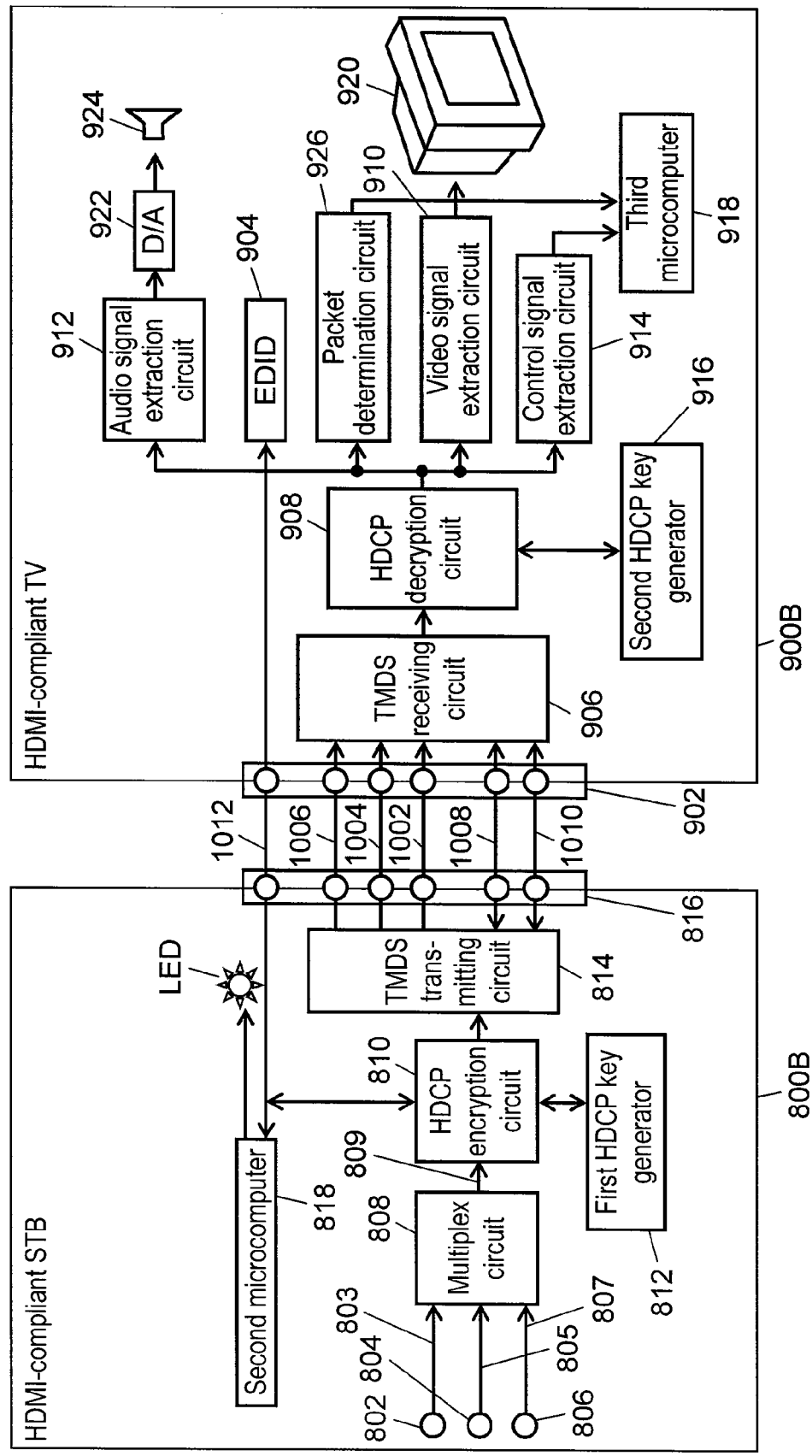
FIG. 9 is a block diagram of a structure in accordance with the present invention.

In FIG. 9, HDMI-compliant STB 800B is given as an example of HDMI Source 800A and HDMI-compliant TV 900B as HDMI Sink 900A in the description.

First, HDMI-compliant STB 800B is described. In HDMI-compliant STB 800B, RGB video signal 803 input from terminal 802, audio signal 805 input from terminal 804, and control signal 807 input from terminal 806 are time-multiplexed in multiplex circuit 808, and becomes multiplex video and audio signal 809. The time multiplexing is a system to multiplex audio signal 805 that is compressed relative to the time axis and control signal 807 in the video blanking period. This time multiplexing forms multiplex video and audio signal 809. Then, multiplex video and audio signal 809 is encrypted in HDCP encryption circuit 810 so as to apply a copy guard. For encryption, HDCP encryption circuit 810 receives a key signal as required from first HDCP key generator 812. Next, an encrypted signal is input to TMDS transmitting circuit 814, converted to 10 bits, and then differential serialization is applied after TMDS encoding. This is transmitted via HDMI connecting terminal 816. Differential signal line 1002 is TMDS Channel 0, and it transmits the B signal (blue signal). Differential signal line 1004 is TMDS Channel 1, and it transmits the G signal (green signal). Differential signal line 1006 is TMDS Channel 2, and it transmits the R signal (red signal). Differential signal line 1008 is TMDS Clock Channel, and it transmits Clock (clock signal).

The key information of HDCP and EDID information are transmitted and received through a 12C bus of differential signal line 1010 in DDC (Display Data Channel) line via HDMI connecting terminal 816 and HDMI connecting terminal 902. EDID 904 is a storage device, such as ROM, that stores the EDID information including a signal format acceptable by the display. Second microcomputer 818 in HDMI-compliant STB 800B reads out the EDID information as required. More specifically, second microcomputer 818 detects that HDMI-compliant STB 800B is connected to HDMI-compliant TV 900B, and reads out the EDID information stored in EDID 904.

Next, HDMI-compliant TV 900B is detailed. Video signals of three systems (R, G, and B signals) input to HDMI-compliant TV 900B and the clock signal of one system are input to TMDS receiving circuit 906. These input signals go through parallelization, TMDS decoding, and 10/8-bit conversion, and then restored to 8-bit RGB video signals. The restored 8-bit RGB video signals are decrypted in DCP decryption circuit 908, and input to video signal extraction circuit 910, audio signal extraction circuit 912, control signal extraction circuit 914, and packet determination circuit 926, respectively. HDCP decryption circuit 908 responds to the key information from HDMI-compliant STB 800B, and transmits the key information from second HDCP key generator 916 to HDMI-compliant STB 800B. After verification by HDMI-compliant STB 800B, decryption is executed.

Control signal extraction circuit 914 extracts control signal 807 superimposed in the video blanking period, and control signal 807 is input to third microcomputer 918. Video signal extraction circuit 910 supplies the RGB video signal to TV display 920. The OSD signal may be added to the RGB video signal by providing an OSD adding circuit (not illustrated), for example, and controlling it with third microcomputer 918.

Next, audio signal extraction circuit 912 extracts audio signal 805 superimposed in the video blanking period. Extracted audio signal 805 is converted from digital to analog by D/A converter 922, and then supplied to audio output unit 924.

A structure of a signal in accordance with the HDMI standard is further described next. FIG. 10 is an example of the SD screen consisting of 858 horizontal pixels and 525 vertical lines for the entire screen, in which its effective are is 720 horizontal pixels and 480 vertical lines. Vertical blanking period is 45 lines, and horizontal blanking period is 138 pixels. TMDS periods include a control period, data island period, and video data period. Packet data is transmitted in this data island period. The packet data includes audio sample (audio signal) and info frame (information related to the signal). The audio signal is transmitted using the data island period in the video blanking period.

Next, a structure of data island is described with reference to FIG. 11. A packet transmitted in the data island period is identified (packet type) by a packet header (Packet header 1 and packet header 2 in FIG. 11), and transmitted in bit 2 of channel 10 in the TMDS signal.

Figure 12:
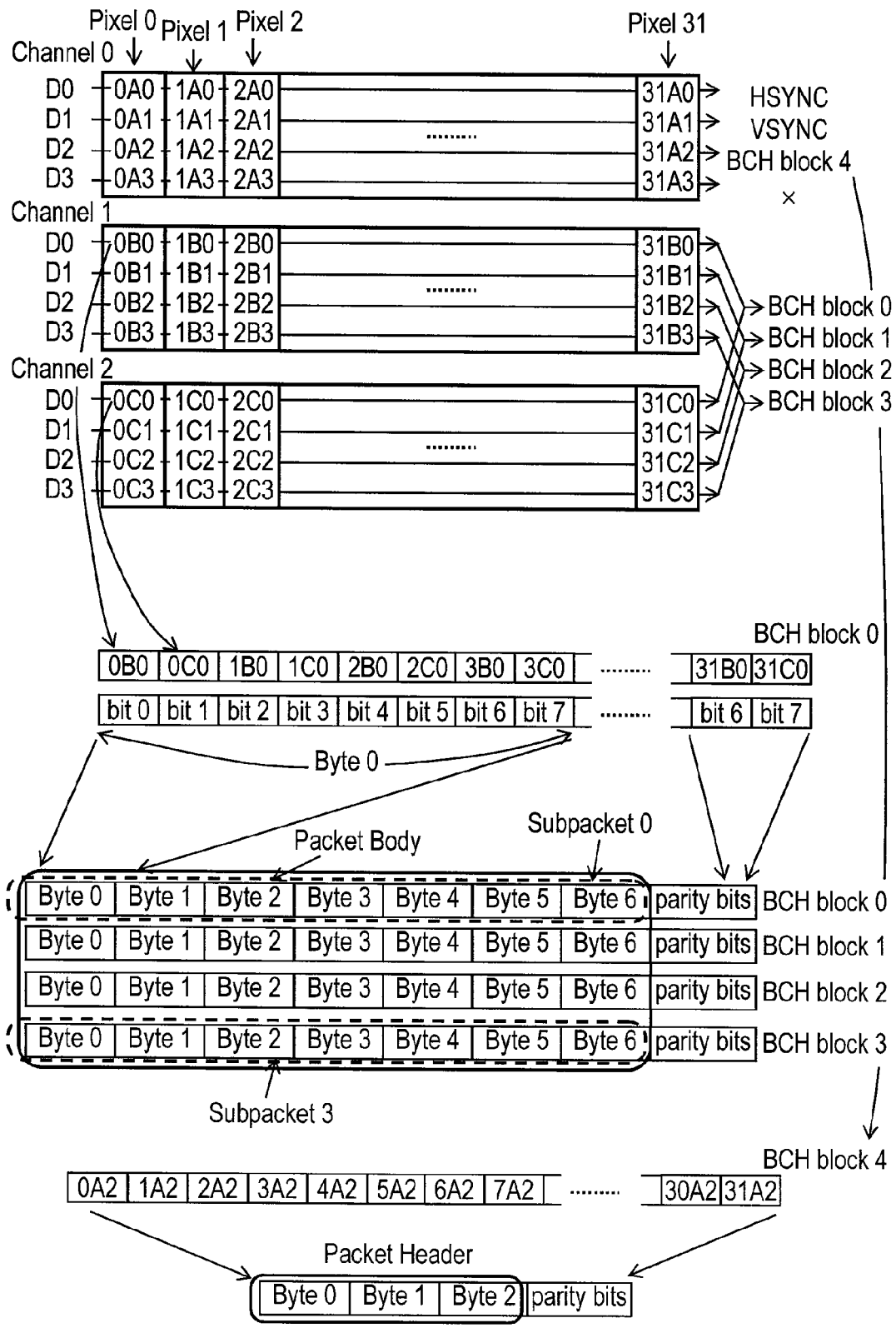
FIG. 12 illustrates a structure of a data island packet in accordance with the present invention.

Next, a structure of the data island packet is further detailed with reference to FIG. 12. The 32-bit data (BCH block 4) transmitted in D2 of Channel 0 has Byte 0 (HB0), Byte 1 (HB1), Byte 2 (HB2), and parity including 8 bits, respectively. HB0 to HB2 are called the packet header. As shown in FIG. 13, HB0 indicates the packet type, and HB1 and HB2 indicate packet-specific data.

Each bit in Channel 1 and Channel 2 is rearranged for every 8 bits (1 byte) to configure a packet body (PB). More specifically, D0 of Channel 1, D0 of Channel 2, and 8 parity bits are added to configure BCH block 0. In the same way, BCH block 1 is configured with D1 of Channel 1, D1 of Channel 2, and parity bits. BCH block 2 is configured with D2 of Channel 1, D2 of Channel 2, and parity bits. BCH block 3 is configured with D3 of Channel 1, D3 of Channel 2, and parity bits. BCH block 1 is configured with subpacket 0, including Byte 0 and Byte 6, and parity bits. Packet Body is configured with Byte 0 to Byte 6 in BCH block 1 to BCH block 3. Accordingly, the data island is configured with the packet header consisting of HB0 to HB, the packet body consisting of BCH block 1 to BCH block 4, and parity bits.

Next, the above packet header and packet type are described with reference to FIG. 12. FIG. 12 shows a structure of the packet header in the data island packet. The packet header is configured with 24-bit data and 8-bit BCH ECC (Error Correction Code) Parity. Out of these, 8 bits in HB0 are used for indicating the packet type, which is described later. Remaining 16 bits are used for indicating packet-specific data.

The packet type in HB0 is detailed below. As shown in FIG. 14, 0x80 in Packet Type Value stores a packet of EIA/CEA-861B InfoFrame. An area of 0x82 in InfoFrame Type is stores AVI (Auxiliary Video Information). As shown in FIG. 15, information to be transmitted is determined for every Data Byte. For example, information of overscan (for TV) and underscan (for computer) is transmitted in Data Byte 1. Information on aspect ratio in Data Byte 2, and information of a video format (34 types from 480p to 1080p are defined by codes. See FIG. 16) in Data Byte 4. An area of 0x83 in InfoFrame Type stores Source Product Descriptor InfoFrame. As shown in FIG. 17, information transmitted in each Data Byte is determined. For example, information of Vendor Name Character (vendor name) is stored in eight characters using from Data Byte 1 to Data Byte 8. When a company name exceeds eight characters, the OSD adding circuit (not illustrated) may include a memory for outputting a complete company name using eight characters as an address so as to supplement the company name for display. Data Bytes 9 to 24 stores information of Product Description Character (model number).

In the first and second exemplary embodiments of the present invention, the picture quality control information in HDMI Source 800A and HDMI Sink 900A is transmitted via differential signal line 1012, which is the CEC line, in FIGS. 8 and 9. More specifically, second microcomputer 818 in HDMI-compliant STB 800B in FIG. 9 transfers the first circuit attribute information in HDMI-compliant STB 800B through differential signal line 1012, which is the CEC line, via HDMI connecting terminal 816 to HDMI connecting terminal 902 of HDMI-compliant TV 900B. HDMI-compliant TV 900B compares this transmitted information and the second circuit attribute information in HDMI-compliant TV 900B using third microcomputer 918. By comparing the first circuit attribute information and the second circuit attribute information, the sound quality processing capability of HDMI-compliant STB 800B and that of HDMI-compliant TV 900B can be compared. As a result, whether HDMI-compliant STB 800B or HDMI-compliant TV 900B is used for processing aforementioned IP conversion, edge enhancement, and color correction of the video signal input to HDMI-compliant STB 800B can be determined.

If the video signal is processed by the first high picture quality processing circuit (not illustrated in FIGS. 8 and 9) in HDMI-compliant STB 800B, the following processing is applicable. Information indicating that video signal processing is applied in HDMI-compliant STB 800B and thus no video signal processing is required in HDMI-compliant TV 900B can be delivered in a part of the signal transmitted via HDMI connecting terminal 816. This information of whether or not processing of the video signal is needed can also be inserted in the aforementioned control period of the TMDS periods. This information can also be transferred through differential signal line 1012, which is the CEC line.

In the above example, the control of picture quality relative to the video signal is described. However, the present invention is not limited to this control. The present invention is also applicable to the control of sound quality relative to the audio signal.

Also in the above example, the control of picture quality and sound quality of the video signal and audio signal is determined based on the circuit attribute information. However, the present invention is not limited to this determination. For example, the user may have an option to chose by displaying multiple patterns on display device 115: The IP conversion in transmitting device 100 and the edge enhancement in receiving device 110, or the IP conversion in receiving device 110 and the edge enhancement in transmitting device 100. In this way, the picture quality and the sound quality can be controlled in the way the user requests.

The above example refers to the combination of two devices that are transmitting device 100 and receiving device 110 (or a combination of transmitting device 600 and receiving device 610, a combination of HDMI Source 800A and HDMI Sink 900A, or a combination of HDMI-compliant STB 800B and HDMI-compliant TV 900B). However, if multiple devices are connected by HDMI, optimal processing may be achieved by a combination of three devices. This enables selection from more variations, achieving further more appropriate processing of the picture quality and the sound quality.

In the third and fourth exemplary embodiments of the present invention, information of a still picture or motion picture and information of coordinates, described in the third exemplary embodiment, are inserted in the aforementioned control period of TMDS periods in FIG. 10. Information of resolution described in the fourth exemplary embodiment is inserted in the aforementioned control period of TMDS periods in FIG. 10.

In the fifth exemplary embodiment of the present invention, the transmitting device supplies information of the most optimal resolution, depending on a signal transmitted, in information of video format types shown in FIG. 16.

In FIG. 16, the video code column indicates a video format code. The video description column indicates a video format. The "EIA/CEA-86 pixel repeat values" column indicates a specification for pixel repetition in the EIA/CEA-86 standard. The "HDMI pixel repeat values" column indicates a specification for pixel repetition in the HDMI standard. Each video format in the video description column is shown in the order of "number of effective horizontal pixels," "x," "number of effective lines and scanning system," "@," and "field frequency (or frame frequency)". For example, the video format of "640×480p @ 60 Hz" means that the number of effective horizontal pixels is 640 pixels, the number of effective lines and scanning system is 480 lines and progressive scanning system, and the field frequency (or frame frequency) is 60 Hz.

The above description refers to the correction of picture quality relative to the video signals contained in input broadcast waves. However, the present invention is not limited to this correction. The present invention is also applicable to the correction of sound quality relative to the audio signals contained in input broadcast waves and correction of signals relative to data signals contained in input broadcast waves.

In the sixth exemplary embodiment of the present invention, the ID number is transmitted through differential signal line 1012, which is the CEC line. This enables the receiving device to output required audio data without adding new audio signal to input audio signal 805 in transmitting device 600.

As described above, the video and audio signal processing system and the transmitting and receiving device of the present invention establish communications between the transmitting side and the receiving side using a bi-directional signal line, and achieve optimal control of the entire system in a frame-accurate manner by providing a bi-directional communication line for transmitting control signals synchronized to video and audio signals and adding a few more control circuits.

INDUSTRIAL APPLICABILITY

The transmitting device, receiving device, and transmitting and receiving device of the present invention share the circuit attribute information between the transmitting side and the receiving side by mutual communication through a bi-directional signal line. Accordingly, the transmitting device, receiving device, and transmitting and receiving device of the present invention can effectively be built into a transmitting and receiving system with high picture quality and high sound quality.

The invention claimed is:

1. A transmitting and receiving system comprising:
   a transmitting device comprising:
      a first high picture quality processing circuit (FHPQC) with a function for correcting a broadcast signal;
      a first recorder for recording first circuit attribute information that indicates the function of the first high picture quality processing circuit; and
      a control circuit that controls the function of the first high picture quality processing circuit, and
   a receiving device comprising:
      a second high picture quality processing circuit (SHPQC) with the function for correcting the broadcast signal transmitted from the transmitting device;
      a second recorder for recording second circuit attribute information that indicates the function of the second high picture quality processing circuit; and
   a comparator for:
      comparing the first circuit attribute information stored in the first recorder with the second circuit attribute information stored in the second recorder; and
      controlling one of the first high picture quality processing circuit and the second high picture quality processing circuit to correct the broadcast signal based on the comparison and controlling another one of the first high picture quality processing circuit and the second high picture quality processing circuit to avoid correcting the broadcast signal, wherein when the comparator controls the FHPQC to correct the broadcast signal and controls the SHPQC not to correct the broadcast signal, the broadcast signal is corrected by the FHPQC using the function and the corrected broadcast signal is transmitted from the FHPQC to the SHPQC and the corrected broadcast signal is not corrected by the SHPQC, and wherein when the comparator controls the FHPQC not to correct the broadcast signal and controls the SHPQC to correct the broadcast signal, the broadcast signal is not corrected by the FHPQC and then transmitted from the FHPQC to the SHPQC and the broadcast signal is corrected by the SHPQC using the function.

2. A transmitting device comprising:

a video signal source for outputting a video signal based on the broadcast wave;

a first high picture quality processing circuit (FHPQC) with a function to correct the video signal output from the video signal source and supply the video signal to a receiving device;

a control circuit that controls the function of the FHPQC; and a first recorder for recording first circuit attribute information that indicates the function of the first high picture quality processing circuit, and outputting the first circuit attribute information to the receiving device for determining one of the first high picture quality processing circuit in the transmitter and a second high picture quality circuit (SHPQC) in the receiving device to correct the broadcast signal with the function, and another one of the first high picture quality processing circuit in the transmitter and the second high picture quality circuit in the receiving device to avoid correcting the broadcast signal, wherein when it is determined that the FHPQC will correct the broadcast signal and the SHPQC will not correct the broadcast signal, the broadcast signal is corrected by the FHPQC using the function and the corrected broadcast signal is transmitted from the FHPQC to the SHPQC and the corrected broadcast signal is not corrected by the SHPQC, and wherein when it is determined that the FHPQC will not correct the broadcast signal and the SHPQC will correct the broadcast signal, the broadcast signal is not corrected by the FHPQC and then transmitted from the FHPQC to the SHPQC and the broadcast signal is corrected by the SHPQC using the function.

3. A receiving device comprising:

a second high picture quality processing circuit (SHPQC) having a function to correct a broadcast signal received from a transmitting device based on first attribute information from the transmitting device;

a temporary memory for the first attribute information from the transmitting device;

a second recorder for recording second circuit attribute information that indicates the function of the second high picture quality processing circuit;

a comparator for:

comparing the first attribute information stored in the temporary memory with the second circuit attribute information stored in the second recorder, and controlling one of a first high picture quality processing circuit (FHPQC) in the transmitter having the function and the second high picture quality processing circuit to correct the broadcast signal based on the comparison and controlling another one of the first high picture quality processing circuit and the second high picture quality processing circuit to avoid correcting the broadcast signal; and wherein when the comparator controls the FHPQC to correct the broadcast signal and controls the SHPQC not to correct the broadcast signal, the broadcast signal is corrected by the FHPQC using the function and the corrected broadcast signal is transmitted from the FHPQC to the SHPQC and the corrected broadcast signal is not corrected by the SHPQC, and wherein when the comparator controls the FHPQC not to correct the broadcast signal and controls the SHPQC to correct the broadcast signal, the broadcast signal is not corrected by the FHPQC and then transmitted from the FHPQC to the SHPQC and the broadcast signal is corrected by the SHPQC using the function a display device for displaying an output of the second high picture quality processing circuit.

4. The transmitting and receiving device of claim 1, wherein the first circuit attribute information includes information on a presence of a function of a predetermined item in the first high picture quality processing circuit and feasibility of controlling the function between enabled and disabled; and the second circuit attribute information includes information on a presence of a function of a predetermined item in the second high picture quality processing circuit and feasibility of controlling the function between enabled and disabled.

5. The transmitting and receiving device of claim 1, wherein the first circuit attribute information and the second circuit attribute information further includes information that allows determination of whether or not the function of the first high picture quality processing circuit and the function of the second high picture quality processing circuit have difference in systems and capability.

6. The transmitting device and receiving device of claim 4, further comprising:

a memory for storing a version number of a determination method of determining the function between enabled and disabled in each function of the first circuit attribute information and the second circuit attribute information.

7. The transmitting device of claim 2, wherein the transmitting device transmits a flag signal that indicates whether or not a video frame of the video signal output from the video signal source is a still picture, the flag signal being transmitted in a blanking period of the video signal.

8. The transmitting device of claim 7, wherein the flag signal has a packet format.

9. The receiving device of claim 3, wherein a flag signal that indicates whether or not a video frame of a video signal is a still picture is detected, and the comparator controls the second high picture quality processing circuit so as to adaptively execute processing based on the flag signal detected.

10. The transmitting device of claim 2, wherein the transmitting device transmits information on one of resolution and scanning system of a video signal output from the video signal source in a packet format in a blanking period of the video signal.

11. The receiving device of claim 3, wherein information on one of resolution and scanning system of an input video signal is detected, and the comparator controls the second high picture quality processing circuit based on the information on one of the resolution and the scanning system detected.

12. The receiving device of claim 3, wherein the receiving device transmits information on the number of horizontal pixels and the number of vertical pixels peculiar to the display device.

13. The transmitting device of claim 2, wherein input information on the number of horizontal pixels and the number of vertical pixels peculiar to a display device is detected, and the first high picture quality processing circuit outputs a signal in resolution having the number of horizontal pixels and the number of vertical pixels same as that detected.

* * * * *